Jan. 8, 1952 W. C. JONES 2,581,417
LUGGAGE CARRIER HAVING PROJECTABLE AND
RETRACTABLE SUPPORTING ROLLERS
Filed July 29, 1948 5 Sheets-Sheet 1
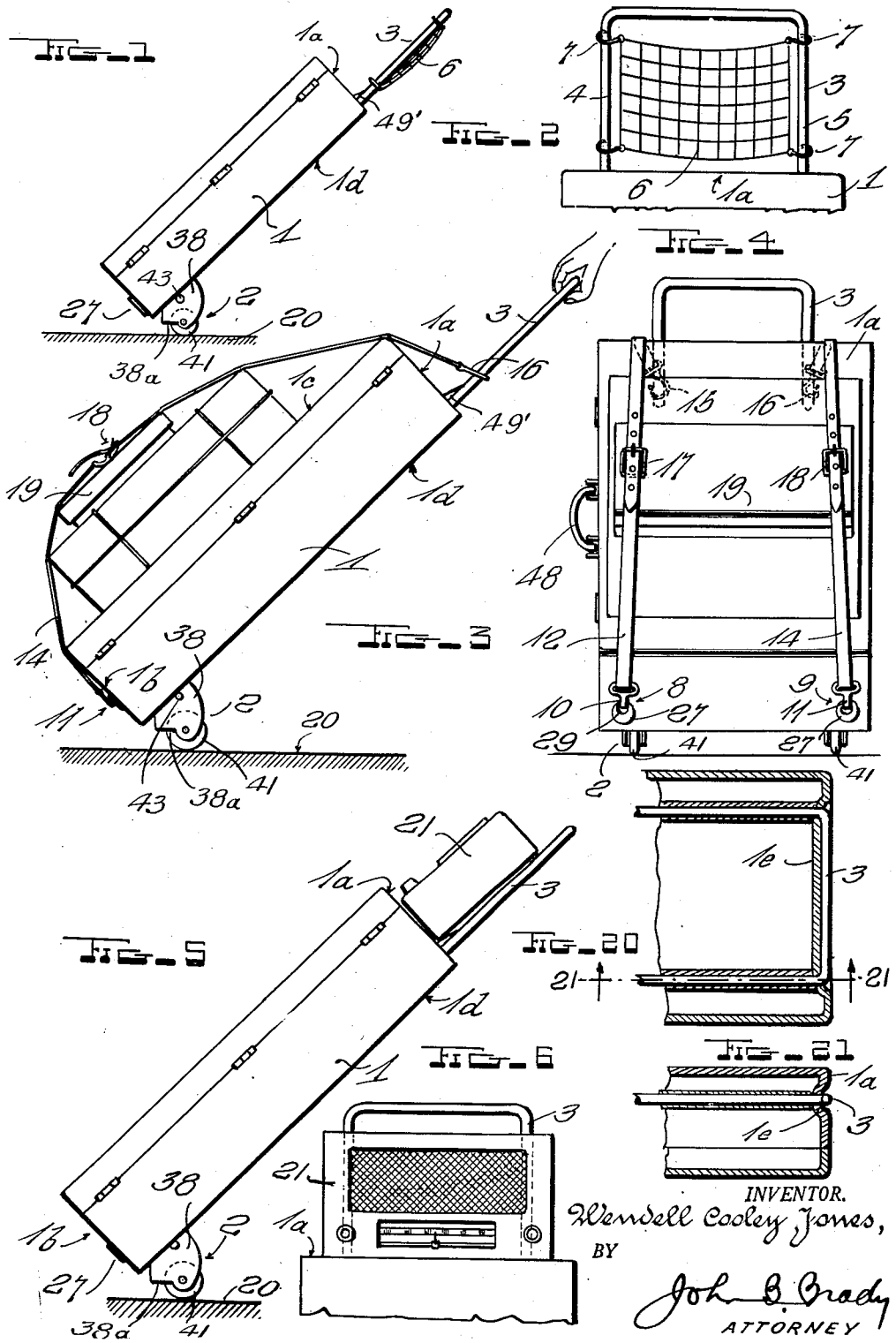
INVENTOR.
Wendell Cooley Jones,
BY
John B. Brady
ATTORNEY

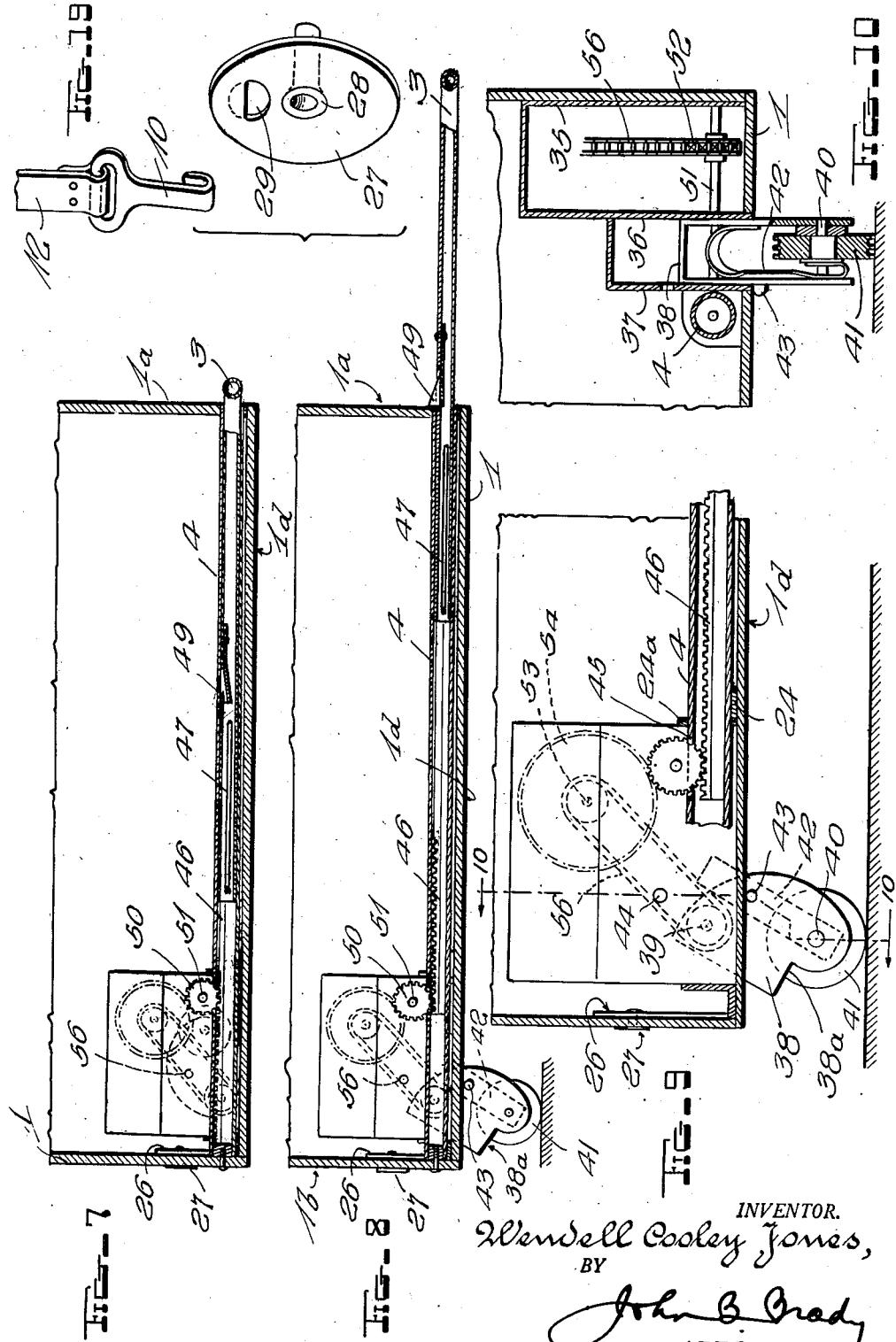

Jan. 8, 1952 W. C. JONES 2,581,417
LUGGAGE CARRIER HAVING PROJECTABLE AND
RETRACTABLE SUPPORTING ROLLERS
Filed July 29, 1948 5 Sheets-Sheet 3
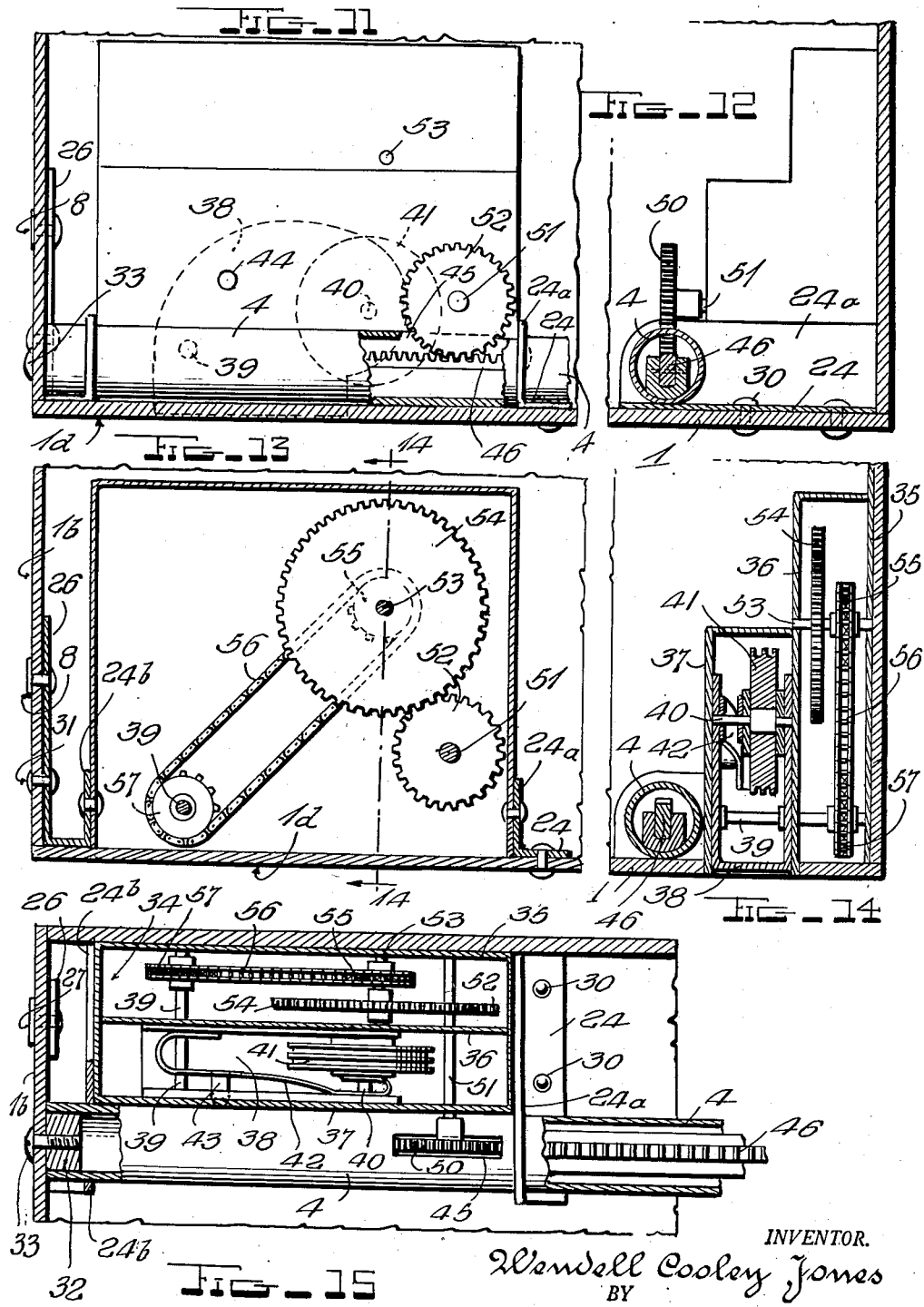
INVENTOR.
Wendell Cooley Jones
BY
John B. Brady
ATTORNEY Jan. 8, 1952
W. C. JONES
2,581,417
LUGGAGE CARRIER HAVING PROJECTABLE AND
RETRACTABLE SUPPORTING ROLLERS
Filed July 29, 1948
5 Sheets-Sheet 4
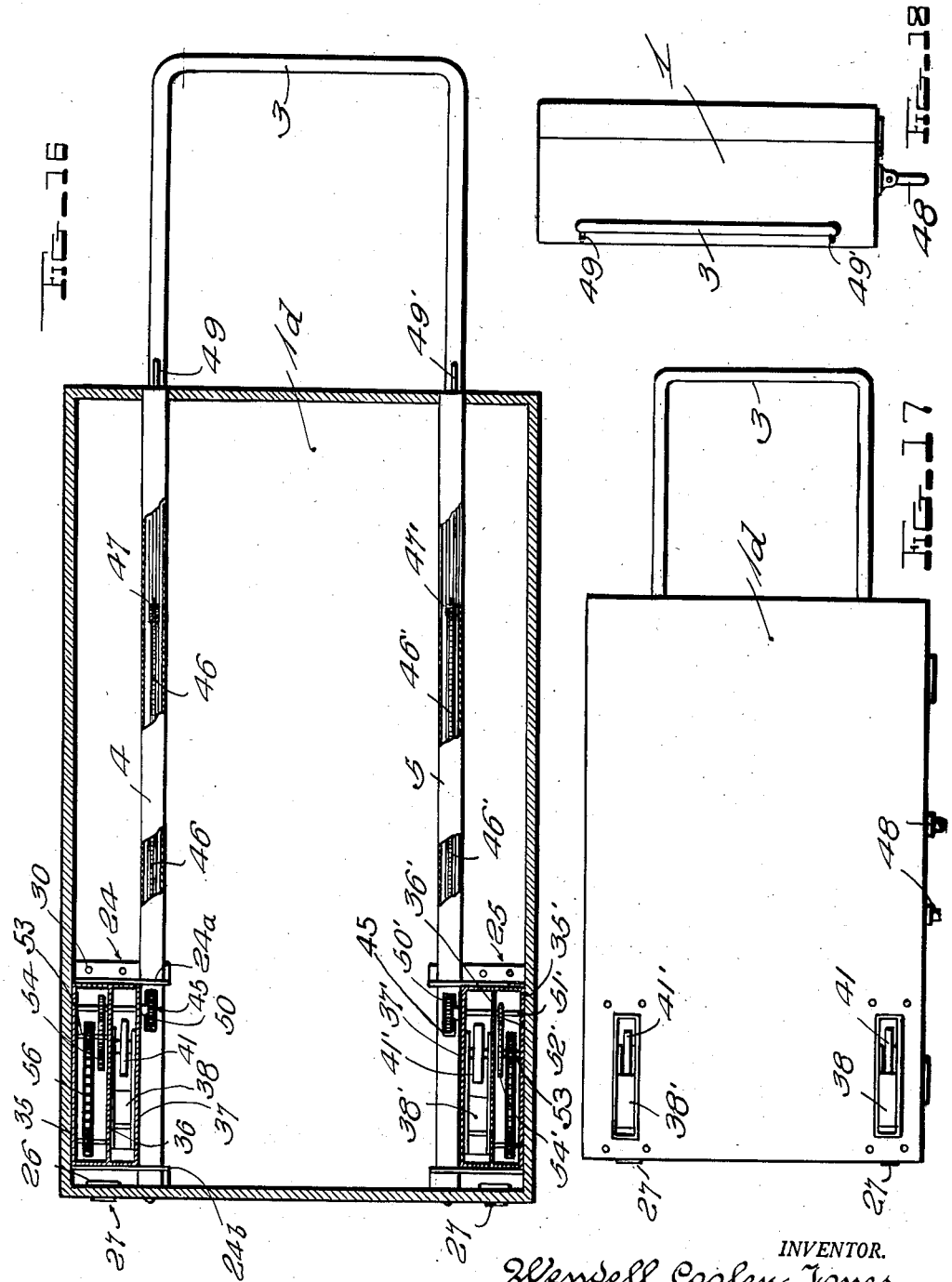
INVENTOR.
Wendell Cooley Jones,
BY
John B. Brady
ATTORNEY

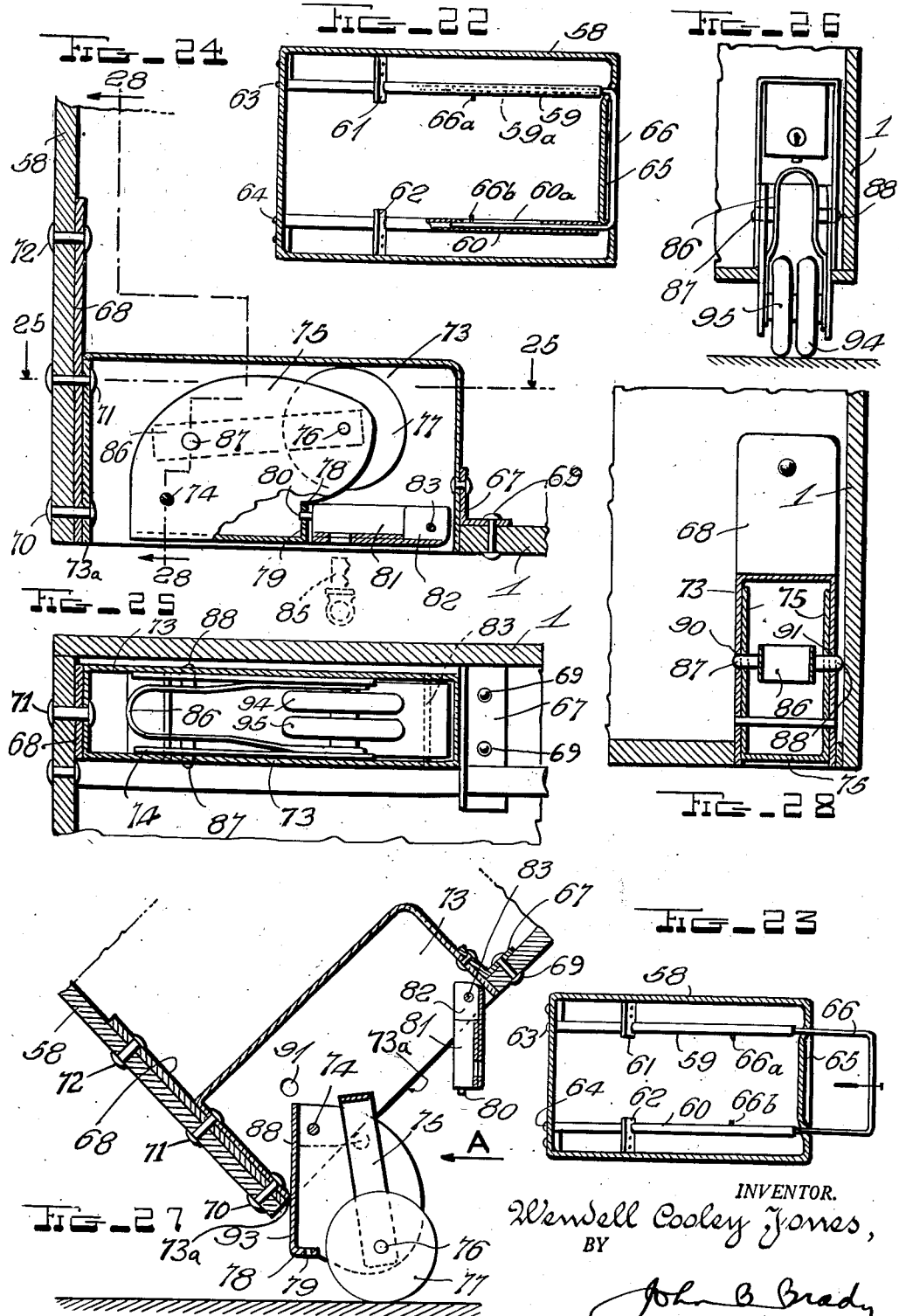

Patented Jan. 8, 1952

2,581,417

UNITED STATES PATENT OFFICE 2,581,417

LUGGAGE CARRIER HAVING PROJECTABLE AND RETRACTIBLE SUPPORTING ROLLERS

Wendell Cooley Jones, Woodstock, N. Y.

Application July 29, 1948, Serial No. 41,369

5 Claims. (Cl. 280—38)

My invention relates broadly to luggage and more particularly to luggage equipment with extendible and retractable rollers for facilitating the transportation thereof.

One of the objects of my invention is to provide a construction of luggage carrier having retractable and projectable rollers therein where the rollers are normally housed in streamlined relation to the luggage and which may be projected therefrom when the luggage is to be transported an appreciable distance.

Another object of my invention is to provide a construction of mounting means for rollers associated with luggage by which the rollers may be normally latched within the luggage and projected therefrom when it is desired to facilitate movement of the luggage by rolling the luggage over an appreciable distance.

A still further object of my invention is to provide a mechanism for coordinating the projection and retraction of roller devices with respect to the wall structure of luggage under control of the inward and outward movement of a handle device associated with luggage.

Still another object of my invention is to provide a construction of handle device for roller equipped luggage which may also serve as an auxiliary support in association with the luggage.

Other and further objects of my invention reside in the roller and handle mechanism for luggage as set forth more particularly in the specification hereinafter following by reference to the accompanying drawings in which:

Figure 1 is a side elevational view showing my invention applied to a conventional suitcase or sample case as an illustration of luggage equipped with the structure of my invention, and particularly illustrating an auxiliary net supported by the handle for carrying an additional load; Fig. 2 is a fragmentary front elevational view of the auxiliary load carrier illustrated in Fig. 1; Fig. 3 shows another method of supporting an auxiliary load with respect to the luggage carrier equipped with the retractable and projectable roller means of my invention; Fig. 4 is a front elevational view of the luggage carrier illustrated in Fig. 3 and showing more particularly the manner of supporting the auxiliary load therein; Fig. 5 shows the application of the luggage carrier of my invention for the support of an auxiliary load on the extended handle; Fig. 6 is a fragmentary elevational view showing the manner of supporting the auxiliary load on the extended handle structure shown in Fig. 5; Fig. 7 is a fragmentary longitudinal sectional view taken through the luggage equipped with the extendible and retractable rollers in accordance with my invention and illustrating the position of the rollers with the handle moved to a position within the luggage; Fig. 8 is a view similar to Fig. 7 but illustrating the handle withdrawn from the luggage and the rollers automatically projected therefrom; Fig. 9 is an enlarged fragmentary sectional view showing the rollers in projected position under control of the projected handle device; Fig. 10 is a transverse sectional view taken substantially on line 10—10 of Fig. 9; Fig. 11 is a fragmentary view similar to Fig. 9 but showing the roller member in retracted position; Fig. 12 is a fragmentary end elevational view partially in section and showing the roller mechanism in Fig. 11 with the roller in retracted position; Fig. 13 is a longitudinal sectional view through the projectable and retractable roller mechanism and illustrating the speed reduction gear for controlling the projection and retraction of the roller; Fig. 14 is a transverse sectional view taken substantially on line 14—14 of Fig. 13 and showing the roller in retracted position; Fig. 15 is a plan view partially in section and illustrating the mechanism for controlling the projection and retraction of the roller member; Fig. 16 is a plan view showing the assembly of the handle mechanism of the projectable and retractable rollers for the luggage, the walls of the luggage being shown in section; Fig. 17 is a bottom plan view of the luggage illustrating the rollers in projected position; Fig. 18 is an end view of the luggage illustrated in Figs. 16 and 17 with the handle in projected position; Fig. 19 is a detail of the strap fastener for supporting the auxiliary load with respect to the luggage as illustrated in Figs. 3 and 4; Fig. 20 shows a modified form of the handle when recessed into the end of the luggage in stream-lined position; Fig. 21 is a fragmentary longitudinal sectional view of the recessed handle in the end of the luggage, the view being taken substantially on line 21—21 of Fig. 20; Fig. 22 is a fragmentary plan view showing my invention as applied to a steamer trunk with the handle in stowed position; Fig. 23 is a view similar to the view shown in Fig. 22 but with the handle in extended position; Fig. 24 is a sectional view showing a modified form of my invention where each individual roller is locked into stowed or streamlined position within the luggage, the particular form illustrated having included a pair of rollers; Fig. 25 is a longitudinal sectional view taken substantially on line 25—25 of Fig. 24; Fig. 26 is an elevational view showing the dual rollers in projected position looking in the direction of arrow A in Fig. 27; Fig. 27 is a fragmentary longitudinal sectional view with the rollers projected as illustrated in Fig. 26; and Fig. 28 is a vertical sectional view taken substantially on line 28—28 of Fig. 24 with the rollers housed in streamlined position within the luggage.

My invention is directed to wheeled luggage for facilitating the transportation of heavily loaded luggage. Wherever in the specification and claims I refer to luggage or luggage carriers I intend to embrace all forms of load carrying devices. In the application of my invention to conventional suitcases I may arrange the roller mechanism in streamlined relation to the luggage so that the roller mechanism may be normally locked within the luggage while the luggage is being carried in conventional manner and unlocked to enable the roller mechanism to be moved to extended position when the loaded suitcase is to be rolled over an appreciable distance. In one form of my invention I provide mechanism which correlates movement of the handle with the projection and retraction of the roller mechanism so that as the handle is pushed into the luggage the roller mechanism is automatically retracted, whereas when the handle is pulled out from the luggage the roller mechanism is automatically projected for supporting the load. I realize that various modifications of the mechanism illustrated herein may be employed for controlling the projection and retraction of the rollers and I desire that it be understood that the mechanism shown herein shall be considered in the illustrative sense and not in the limiting sense.

Referring to the drawings in detail, reference character 1 in Fig. 1 illustrates a conventional suitcase with the projectable and retractable roller mechanism indicated generally at 2 installed in the lower end thereof, and with the projectable handle mechanism indicated at 3 installed in the opposite end thereof. The handle 3 is substantially in the form of a U, having longitudinally extending portions telescopically sliding into the luggage through longitudinally extending tubes 4 and 5 installed therein immediately adjacent the inside of one of the plane walls thereof. When handle 3 is moved to the extended position shown in Fig. 1 and when the roller mechanism illustrated generally at 2 is in its projected position as shown, a net 6 may be hooked between the opposite sides of the U by means of hook members illustrated at 7 engageable over the longitudinally extending portions of the handle 3 and serves as a carrier for an additional load. This net 6 is particularly adaptable as a back-rest in carrying a small child who may be seated on the upper end 1a of the suitcase, thereby facilitating both the transportation of the child and the loaded luggage over a substantial distance. The opposite end of the suitcase 1b is provided with recessed hook devices which I have indicated at 8 and 9 in Fig. 4, each of which receives the hook-shaped ends 10 and 11 of the straps 12 and 14 illustrated in Figs. 3 and 4. The straps 12 and 14 extend over the plane wall surface 1c of the suitcase and terminate in hooks 15 and 16 which readily engage around the longitudinally extending portions of handle 3. These straps 12 and 14 are provided with adjustable buckles 17 and 18 which permit additional articles, such as illustrated at 19, to be readily strapped against the plane wall surface 1c of the suitcase and moved as an additional load facilitated by roller mechanism 2 rolling over the plane surface 20.

The assembly of the projectable and retractable handle 3 with respect to suitcase 1 is such that I may employ the carrier as illustrated in Figs. 5 and 6 for supporting an auxiliary load 21 resting against the upper end 1a of the suitcase and against the projected handle 3. This additional facility is well adapted for the support of a portable radio set, for example.

The essential consideration in the development of my invention has been the assembly of the fittings which carry the rollers in the flat plane-like wall of the luggage so that the luggage is rolled with its major plane surfaces extending at an angle to the surface over which the luggage is transported. This is to be very clearly distinguished from any proposal of mounting roller mechanism adjacent the end of the luggage to enable the luggage to be rolled in relatively the same position in which it is normally carried as hand luggage. In other words, in applying the mechanism of my invention to luggage I would arrange the mechanism so that the plane of the luggage is displaced substantially 90° away from the plane in which the luggage is normally carried by hand. This greatly stabilizes the luggage in its rolling movement and thereby permits the luggage to serve as support for additional luggage which would otherwise not be practical where the luggage rolled is in the same vertical plane in which it is normally manually carried.

In Figs. 7-18 I have shown one form of mechanism embodying the principles of my invention which coordinates the movement of the handle 3 with the projection and retraction of the roller mechanism. The longitudinally extending members 4 and 5 extend longitudinally through spaced fittings 24 and 25 installed interiorly of the suitcase and immediately adjacent the opposite sides thereof adjacent the plane wall 1d thereof. The fittings 24 and 25 are each formed from rigid metallic construction and are reinforced with respect to the sides of the luggage to ensure a construction which will withstand severe strains as the entire weight of the luggage is divided between the two fittings 24 and 25. For this purpose each fitting 24 and 25 is reinforced by an upstanding bracket represented at 26 riveted to the end 1b of the luggage. Bracket 26 also serves as a securing means for the recessed hook device 8 shown more particularly in Fig. 19 and by which the strapping of an auxiliary load to the luggage is effected. This auxiliary hook device shown more particularly in Fig. 19 comprises a disc-shaped member 27 secured by means of rivet 28 to the end 1b of the luggage and through the bracket 26 of the fitting within the luggage. The disc 27 has a recessed opening 29 therein into which the hook 10 attached to strap 12 is conveniently attachable. Thus the load is distributed to the fitting 24 through bracket 26 and not directly to the wall structure of the luggage. Fitting 24 is riveted to the wall 1d of the luggage as represented at 30 and to the end 1b of the luggage as represented at 31. The ends of the tubular members 4 and 5 extend through upstanding transverse flanges of each of the fittings 24 and 25 as represented at 24a and 24b. The end of each tubular member 4 and 5 is secured to the end 1b of the luggage. I have indicated this in the case of tubular member 4 by plug 32 secured by fastening means 33 through the end 1b of the luggage. Plug 32 is suitably secured to the end of tube 4 so that a rigid connection may be made thereto by fastening means 33 extending through the end 1b of the luggage.

Each fitting 24 and 25 is provided with a partitioned frame represented at 34 and secured between the flanges 24a and 24b. The partitioned frame 34 is provided with spaced parallel extending members 35, 36, and 37 which serve as journalling means for the mechanism which controls the rollers. As shown in Figs. 7-16 plate members 36 and 37 serve as journalling means for the substantially U-shaped frame 38 pivotally mounted at 39. The substantially U-shaped frame 38 includes a pair of substantially parallel extending side portions, the extremities of which carry a transverse axle member 40 which serves as journalling means for the roller 41. The frame 38 is abruptly cut away as represented at 38a and provides a finger engaging portion which in one form of my invention facilitates the withdrawal of the frame 38 from streamlined housed position within the luggage. The U-shaped frame 38 has leaf spring 42 mounted therein and yieldably mounted with respect to axle 40 at one end, as represented more clearly in Fig. 15, and yieldably mounted with respect to pivot member 39 at the other end. Yieldable strap member 42 carries a detent 43 therein, adapted to register with aperture 44 in plate 37 when the roller is in stowed position. In Figs. 9 and 10 I have shown the manner in which detent 43 engages beneath the peripheral edge of plate 37 when the roller is in projected position for latching the roller in projected position. Before retracting the rollers it is necessary to press detent 43 inwardly against spring 42 to enable substantially U-shaped frame 38 to move into the housing and between plates 36 and 37, as shown more clearly in Fig. 14.

In order to properly control the movement of roller member 41 there must be a reduction in movement between the length of the stroke of the handle device 3 and the angular distance through which substantially U-shaped frame 38 must move. A variety of mechanisms may be provided for this purpose and I have illustrated one form of such mechanism for the purpose of explaining my invention, but I desire that it be understood that modifications of such mechanism may be provided and no limitations on my invention to the particular mechanism shown are intended.

Inasmuch as each of the rollers provided in spaced positions in the plane side wall of the luggage is identical in construction I have indicated in Figs. 16 and 17 the two rollers and their associated control mechanism by the same reference characters bearing a prime relation to each other, i. e., substantially U-shaped frame 38' corresponds to frame 38 heretofore explained, and roller 41' corresponds to roller 41 heretofore explained. The mechanism is mounted with respect to the plates 35', 36', and 37' which correspond to the plates 35, 36, and 37 heretofore explained.

In order to control the projection and retraction of the roller members 41 and 41' simultaneously with the projection and retraction of the handle 3, I provide a slot within tubular members 4 and 5 as represented at 45 and 45'. Beneath each of these slots I arrange a rack extension 46 and 46', coextensive with the longitudinally extending ends of the handle 3 with lost motion connections represented at 47 and 47' interposed therein. That is to say, I provide a loose coupling connection between the projectable and retractable end of the handle 3 and the racks 46 and 46' so that handle 3 can be readily stowed with respect to the end wall 1a of the luggage and yet sufficient transitory movement imparted to the racks 46 and 46' to ensure operation of the retractable and extendible mechanism. In Figs. 20 and 21 I have shown one manner of mounting the handle 3 with respect to the end 1a of the luggage wherein the end 1a is provided with a transversely extending recess 1e conforming to the shape of the handle 3 to be projected inwardly into the end of the luggage and in substantially streamlined relation thereto. Thus handle 3 is concealed and roller members 2 are concealed in streamlined relation to the sides of the luggage. Inasmuch as the connecting hooks 8 are substantially coplanar with the end 1b of the luggage, the luggage for all practical purposes has the appearance of conventional luggage when it is being carried by the conventional handle which I have indicated at 48 in Figs. 4, 17, and 18.

The handle 3 carries a pair of spring actuated detents 49 and 49' which latch the handle 3 in its extended position as it is withdrawn from the luggage. The spring actuated detents 49 and 49' must be manually pressed inwardly in order to move the handle 3 to retracted position.

The racks 46 and 46' mesh with rack gears 50 and 50' which extend through slots 45 and 45' in tubes 4 and 5 respectively. The rack gears 50 and 50' are carried by transversely extending shaft members 51 and 51' respectively. These shaft members 51 and 51' are journalled in the upstanding plates 35, 36, and 37 and 35', 36', and 37'. Shaft members 51 and 51' carry gears 52 and 52' respectively, disposed in a position intermediate vertically extending plates 35 and 36 and 35' and 36'. A counter-shaft 53 is journalled between plates 35 and 36 and carries a gear 54 which meshes with gear 52. Similarly, counter-shaft 53' is journalled between plates 35' and 36' and carries gear 54' thereon meshing with gear 52'. Shaft 53 carries a sprocket-gear 55 which is engaged by the sprocket chain 56 which loops over the sprocket gear 57 carried by shaft 39 journalled in plates 35, 36, and 37. Shaft 39 is keyed to the frame 38 which carries the roller 41 so that as gear 54 revolves sprocket gear 55 rotates, sprocket chain 56 is moved, wheel 57 is revolved and shaft 39 is revolved to move frame 38 carrying roller 41 to a projected position illustrated more clearly in Figs. 8, 9, and 10. The ratios of the gears has been developed in approximately the ratio of one to three, so that projection and retraction of the roller members is controlled at a slower rate than the inward and outward movement of the handle 3. It will be understood that the components in the complementary fitting installed in the luggage are of identical construction with the components heretofore explained and are illustrated as heretofore noted by corresponding reference characters with prime designations added thereto.

In Figs. 22 and 23 I have shown the application of my invention to a steamer trunk wherein the steamer trunk is illustrated in horizontal section at 58 wherein tubular members 59 and 60 extend the length of the bottom of the trunk and are securely braced therein by brackets 61 and 62 and are secured at the ends thereof at 63 and 64. The end of the steamer trunk is recessed as represented at 65 for the entry of handle member 66 into streamlined relation with the end of the trunk as represented in Fig. 22. In this embodiment of my invention tubes 59 and 60 are each slotted as represented at 59a and 60a and pins 66a and 66b carried by handle member 66 project outwardly through slots 59a and 60a which serve to restrict the outward movement of handle member 66. In this particular embodiment of my invention there is no coordination between the movement of the handle and the movement of the roller members as the roller members are independently unlatched and moved to operative position manually in this form of my invention.

In Fig. 24 I have shown the manually controlled form of roller fitting which may be employed in association with the manually controlled handle arrangement of Figs. 22 and 23. In this form of my invention a frame 67 having upwardly extending reinforcing bracket 68 is secured interiorly of the trunk 58 and securely fastened thereto by securing means such as rivets 69, 70, 71, and 72. Frame structure 73 is arranged within the frame 67 and serves as a journalling means for shaft 74. Shaft 74 provides a bearing for the roller frame 75 which carries on the extremity thereof the axle 76 on which roller 77 is supported. The roller frame 75 is provided with an inwardly extending locking plate portion 78 apertured at 79 to enable the locking bolt 80 of the lock member 81 to be projected therethrough when the lock member 81 is moved to a position aligned with locking plate 78 as represented in Fig. 24. Lock member 81 is carried by a pivotally mounted plate 82 journalled at 83 within the frame structure 73. A cylinder lock forming part of lock member 81 is adapted to be operated by key represented at 85 in order to withdraw locking bolt 80 from locking plate 78 or to project the locking bolt into the locking plate.

The roller frame 75 carries spring strip member 86 interiorly thereof with detents 87 and 88 extending laterally therefrom. These detents normally enter apertures 90 and 91 in the sides of the frame 92 for maintaining the roller member in retracted position and to project beneath the edge of frame structure 73 as represented in Fig. 27 for maintaining the roller member in projected position. The two extreme positions of the roller member may be seen in Fig. 24 as housed within the trunk and in Fig. 27 as projecting from the trunk. It will be observed that considerable reinforcement is provided for the roller members in projected position by the abutment of the top portion 93 of roller frame 75 with the peirpheral edge 73a of frame structure 73 as shown in Fig. 27.

In order to handle the heavy loads incident to the movement of loaded trunks, I may employ dual rollers as represented at 94 and 95 in Figs. 25 and 26. The load is thus distributed over a large area facilitating transportation of the trunk. It will be understood that two such fittings as hereinbefore described are provided in spaced locations adjacent the lower end of the trunk and that the components thereof are similar to the components hereinbefore described.

I realize that modifications may be made in the arrangement of gearing and in the arrangement of projecting the roller members and streamlined position within the luggage to projected position beyond the luggage, and vice versa, and I do not intend that my invention shall be limited to the particular illustrative disclosure set forth herein. Also, I realize that modifications may be made in the form of the lock for latching the rollers in streamlined position within the luggage in the forms of my invention in which the manual control is employed as distinguished from correlated automatic control of the handle and projectable and retractable rollers. Accordingly, I desire it to be understood that no limitations upon my invention are intended other than may be imposed by the scope of the appended claims.

What I claim as new and desire to secure by Letters Patent of the United States, is as follows:

1. A luggage carrier comprising a case substantially in the form of a parallelepiped having one of the walls thereof slotted at spaced positions adjacent one end of the carrier, a fitting disposed in each of the slotted portions of the carrier, a frame pivotally mounted in each of said fittings adjacent the end of the carrier, each of said fittings including a base portion adapted to extend in coplanar relation with the side wall of said carrier when said frame members are moved to retracted position within the carrier, a roller member journaled in each of said frame members and adapted to support the load of said carrier when said frame members are moved to projected position, a pair of spaced tubular members disposed within said carrier adjacent one wall thereof and connected with each of said fittings, and a handle member projectable into and extendible in said tubular members.

2. In a wheeled support for a luggage carrier, substantially in the form of a parallelepiped having a pair of spaced side walls forming the sides of the luggage carrier, one of said side walls having spaced slots therein adjacent one end thereof, a housing member individual to each of the slotted portions of the side wall, a frame pivotally mounted in each of said housing frames, said frame including a back portion terminating short of the length of the housing frame to provide a finger grip entrance for withdrawing said frame from said housing frame, and a roller member carried by each of said frames for supporting and moving said luggage carrier, the back portion of said frame establishing abutting relation with one end of said frame member when said frame is moved out of said frame members for supporting the mass of said carrier above the roller.

3. In a wheeled support for a luggage carrier, substantially in the form of a parallelepiped having a pair of spaced side walls forming the sides of the luggage carrier, one of said side walls having spaced slots therein adjacent one end thereof, a housing member individual to each of the slotted portions of the side wall, a substantially U-shaped frame pivotally mounted in each of said housing frames and carrying a roller member journaled therein, said substantially U-shaped frame including a back portion terminating short of the length of the housing frame to provide a finger grip entrance for angularly moving said substantially U-shaped frame from said housing frame, and means associated with each of said frames for positively latching said frames in either projected or retracted position with respect to the side wall of the luggage carrier, the back portions of said frame establishing abutting relation with one end of said housings when said frames are projected out of said housings for supporting the mass of said carrier above said roller members.

4. In a wheeled support for a luggage carrier, substantially in the form of a parallelepiped having a pair of spaced side walls forming the sides of the luggage carrier, one of said side walls having spaced slots therein adjacent one end thereof, a housing member individual to each of the slotted portions of the side wall, a frame pivotally mounted in each of said housing frames, said frame including a back portion terminating short of the length of the housing frame to provide a finger grip entrance for withdrawing said frame from said housing frame, a roller member carried by each of said frames for supporting and moving said luggage carrier, means associated with each of said frames for positively latching said frames in either projected or retracted position with respect to the side wall of the luggage carrier, and separate means for locking said frames in housed positions within said housing frames.

5. A luggage carrier comprising in combination with a luggage case a handle structure extendible from and projectable into the case, a pair of spaced frame housings disposed in one wall of the case adjacent the end thereof, frames pivotally mounted in each of said frame housings, a roller member journaled in each of said frames, and coacting rack pinion and gear means interposed between said handle structure and each of said frames for controlling the projection and retraction of said frames through angular distances of approximately 90° during the linear projection and retraction of said handle structure with respect to the end of said case, said frames establishing abutting relation with said frame housings when said frames are projected from said frame housings for supporting said case above said roller members.

WENDELL COOLEY JONES.

REFERENCES CITED

The following references are of record in the file of this patent:

UNITED STATES PATENTS

| Number | Name | Date |
|---|---|---|
| 44,936 | Clapp | Nov. 8, 1864 |
| 854,602 | Peterson | May 21, 1907 |
| 863,972 | Ehlers | Aug. 20, 1907 |
| 1,081,670 | James | Dec. 16, 1913 |
| 2,002,836 | Rossi | May 28, 1935 |
| 2,439,660 | Keil | Apr. 13, 1948 |
| 2,510,754 | Norlin | June 6, 1950 |